United States Patent [19]

Ikebuchi

[11] Patent Number: 5,477,837
[45] Date of Patent: Dec. 26, 1995

[54] CONTROLLER FOR INTERNAL COMBUSTION ENGINE

[75] Inventor: Kazuhiro Ikebuchi, Hyogo, Japan

[73] Assignee: Mitsubishi Denki Kabushiki Kaisha, Tokyo, Japan

[21] Appl. No.: 208,839

[22] Filed: Mar. 11, 1994

[30] Foreign Application Priority Data

Oct. 26, 1993 [JP] Japan .................................. 5-267269

[51] Int. Cl.⁶ .................................................. F02M 33/02
[52] U.S. Cl. ...................................... 123/520; 123/198 D
[58] Field of Search .................................. 123/516, 520, 123/198 D, 518, 519, 521

[56] References Cited

U.S. PATENT DOCUMENTS

| | | | |
|---|---|---|---|
| 4,601,199 | 7/1986 | Denz . | |
| 4,665,882 | 5/1987 | Otobe | 123/571 |
| 4,748,959 | 6/1988 | Cook | 123/520 |
| 4,949,695 | 8/1990 | Uranishi | 123/520 |
| 5,054,454 | 10/1991 | Hamburg | 123/520 |
| 5,172,672 | 12/1992 | Harada | 123/520 |
| 5,176,123 | 1/1993 | Hosoda | 123/520 |
| 5,230,319 | 7/1993 | Otsuka | 123/520 |
| 5,241,940 | 9/1993 | Gates | 123/571 |

FOREIGN PATENT DOCUMENTS

| | | | |
|---|---|---|---|
| 0027922 | 3/1977 | Japan | 123/571 |
| 0259150 | 10/1988 | Japan | 123/571 |

*Primary Examiner*—Carl S. Miller
*Attorney, Agent, or Firm*—Sughrue, Mion, Zinn, Macpeak & Seas

[57] ABSTRACT

A controller for an internal combustion engine including: an introducing path for introducing air or a mixture of fuel and air into an intake manifold of the internal combustion engine; a control valve, arranged along the introducing path, for controlling an amount of the air or the mixture of fuel and air introduced therein; and a pressure sensor for detecting pressure within the introducing path between the control valve and the intake manifold.

6 Claims, 4 Drawing Sheets

CONTROLLER FOR INTERNAL COMBUSTION ENGINE

BACKGROUND OF THE INVENTION

The invention relates to controllers for internal combustion engines.

FIG. 6 is a diagram showing a construction of an exemplary fault judging system in a conventional controller for an internal combustion engine. In FIG. 6, reference numeral 1 designates an engine; 2a, a surge tank disposed on an intake manifold 2 of the engine 1; 3, a throttle valve; 4, an EGR valve; 5, an EGR control solenoid; 6, a pressure sensor for measuring pressure within the surge tank 2a; 7, a canister for absorbing transpired fuel gas produced within a fuel tank (not shown); 8, a purge air introducing path extending from the canister 7 and connected to the surge tank 2a; 9, a purge control solenoid disposed within the purge air introducing path 8 and serving as a control valve to cause the engine 1 to suck the purge air under predetermined operating conditions; and 10, an engine control unit (ECU).

FIGS. 7 and 8 are time charts showing exemplary operations of fault judging systems employed in the conventional internal combustion engine controller. FIG. 7 shows an operation of a purge fault detecting system monitor; and FIG. 8 shows an operation of an EGR fault detecting system monitor.

In FIG. 7, "Purge" indicates an operating condition of the purge control solenoid 9; and "F/B I" indicates an integrating coefficient in a feedback control of an air-to-fuel ratio of the fuel supply system. In FIG. 8, "EGR" indicates an operating condition of the EGR valve 4; and "P" indicates pressure detected by the pressure sensor 6.

The principle of fault judgment will be described with reference to FIGS. 6 to 8. In the purge fault detecting system monitor, a mean value Im1 of the integrating coefficient in the air-to-fuel ratio feedback control of the fuel supply system with the purge control solenoid 9 closed and a mean value Im2 thereof with the purge control solenoid 9 open are obtained. If the absolute value of their difference (|Im1−Im2|) is smaller than a predetermined value, then the purge fault detecting system is judged abnormal. As a result of the judgment, abnormalities such as defective operation of the purge control solenoid 9, wire breakage, leakage of the piping system, or the like are located. Conversely, if the absolute value is greater than the predetermined value, the purge fault detecting system is judged normal.

In the EGR fault detecting system monitor, a pressure Pe1 and a pressure Pe2 within the surge tank 2a respectively measured by the pressure sensor 6 under the conditions that the EGR valve 4 is closed and that the EGR valve 4 is open with the purge control solenoid 9 closed are obtained. If their difference (Pe2−Pe1) is smaller than a predetermined value, then the EGR fault detecting system is judged abnormal. As a result of the judgment, abnormalities such as defective operation of the EGR valve 4, wire breakage, leakage of the piping system, or the like are located. Conversely, if the absolute value is greater than the predetermined value, the EGR fault detecting system is judged normal.

The conventional internal combustion engine controller of this type is designed to measure pressure change by the pressure sensor 6 using a pressure pipe 11 as shown in FIG. 6. Affected by dust and moisture contained in an EGR gas, foreign matter adheres to or gets frozen at the pressure sensor 6 and the pressure pipe 11 to clog them, which is a problem encountered by the conventional controller.

Further, in the purge fault detecting system monitor of the fault judging system, the air-to-fuel ratio of the mixture of fuel and air sucked into the engine 1 by introducing the purge air is changed toward the lean side or toward the rich side if the fuel adsorbing rate within the canister 7 is either 0% or 100%, so that normal/abnormal judgments based on the above-mentioned principle can be achieved. However, if the fuel adsorbing rate is an intermediate value, then change in the air-to-fuel ratio of the mixture of fuel and air is so small even at the time of introducing the purge air that the normal operation can erroneously be judged as abnormal, which is another problem.

Still further, if the purge system fault detection is based on the difference in pressure, then another pressure sensor must be provided.

Still further, no flow rate limiting means is disposed along the introducing path. Therefore, the advantage that deviation in pressure is increased at the location of such means cannot be obtained, thereby not improving the performance of the pressure sensor 6.

SUMMARY OF THE INVENTION

The invention has been made to overcome the above-mentioned problems. Accordingly, a first object of the invention is to provide a controller for an internal combustion engine which can eliminate the clogging of a pressure sensor by disposing the pressure sensor at a portion of an introducing path extending from a canister.

Further, a second object of the invention is to provide a controller for an internal combustion engine which can reduce erroneous detection of purge system faults.

Furthermore, a third object of the invention is to provide a controller for an internal combustion engine which can make an EGR fault judgment similar to that in the conventional example while achieving a simple, inexpensive, and reliable purge fault detecting system involving no additional sensors and the like.

Still further, a fourth object of the invention is to provide a controller for an internal combustion engine which can increase deviation in pressure by limiting the flow rate and improve the detecting performance of the pressure sensor.

According to first aspect of the invention, a controller for an internal combustion engine uses the same components as in the conventional example and is designed to branch a pressure intake for supplying pressure to a pressure sensor along a purge air introducing path. The pressure pipe connected to the pressure sensor is disposed on the introducing path through which air or a mixture of fuel and air flows toward the EGR gas entering side. Therefore, the purge air flows toward the EGR gas entering side, so that extraneous matter such as dust or moisture which causes the pressure sensor to clog is driven out, thereby preventing the clogging of the pressure sensor.

According to second aspect of the invention, a controller for an internal combustion engine is designed to detect a purge system fault based on a difference in pressure. Therefore, erroneous detection can be eliminated.

According to third aspect of the invention, a controller for an internal combustion engine is designed to dispose a pressure sensor on an introducing path extending from a canister so that the pressure sensor can be shared in common by an EGR fault detecting system monitor and a purge fault detecting system monitor. The pressure change at the purge air introducing path when the purge control solenoid is operated can be detected by the purge fault detecting system monitor. Therefore, the fault judgment is facilitated without additionally providing components such as sensors and actuators. In addition, the fault judgment according to the conventional procedure can be made by the EGR fault detecting system monitor while temporarily keeping the purge control solenoid closed. Therefore, there is no need to additionally provide sensors and the like.

According to fourth aspect of the invention, a controller for an internal combustion engine is designed to dispose a flow rate limiting means on an introducing path for a pressure sensor. Therefore, deviations in pressure at the introducing path are increased, thereby improving the performance of the pressure sensor.

DETAILED DESCRIPTION OF THE PREFERRED EMBODIMENTS

Figure 1:
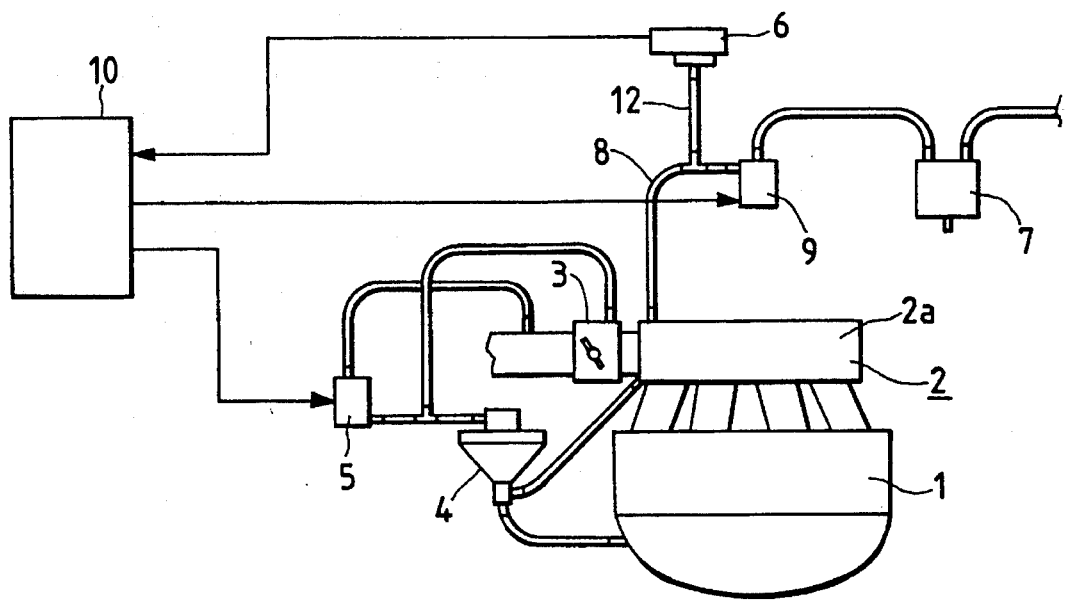
FIG. 1 is a diagram showing a construction of an embodiment of the invention.
Figure 6:
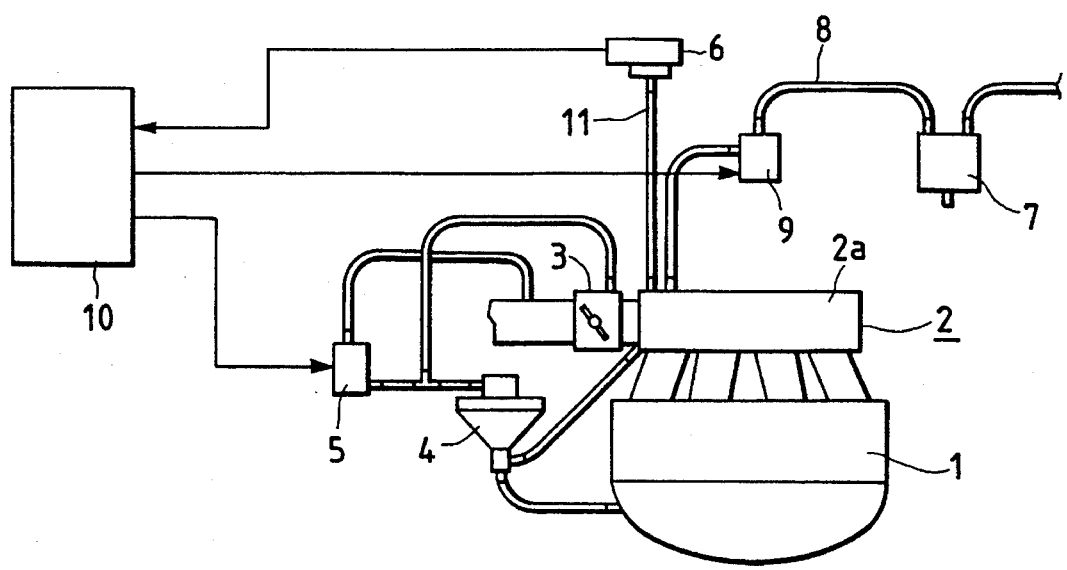
FIG. 6 is a diagram showing a construction of a conventional example.

A first embodiment of the invention will be described with reference to FIG. 1. What is modified from the conventional example is that a pressure intake (pressure pipe) 12 for supplying pressure to a pressure sensor 6 is located in the vicinity of a purge control solenoid 9 of a purge air introducing path 8 that is connected to a surge tank 2a, instead of directly connecting the pressure intake to the surge tank as in the conventional example. In FIG. 1, the same reference characters as in FIG. 6 designate the same or like parts and components.

Figure 2:
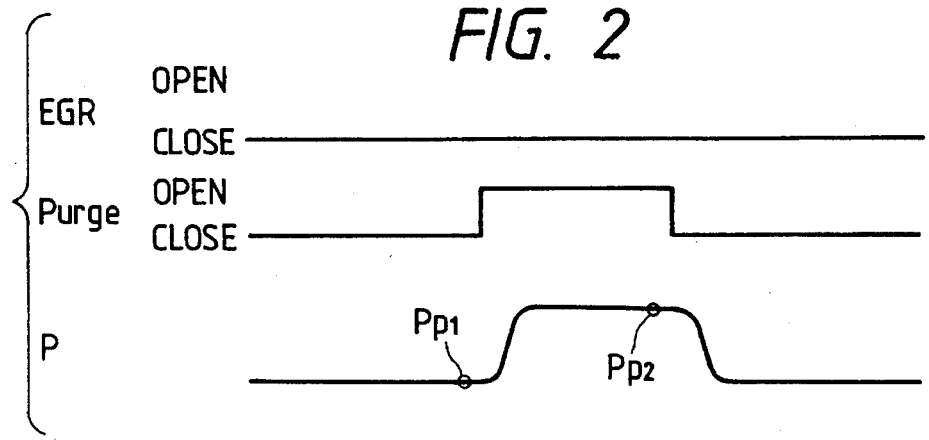
FIG. 2 is a time chart illustrative of an operation of a purge fault detecting system monitor in the apparatus shown in FIG. 1.
Figure 3:
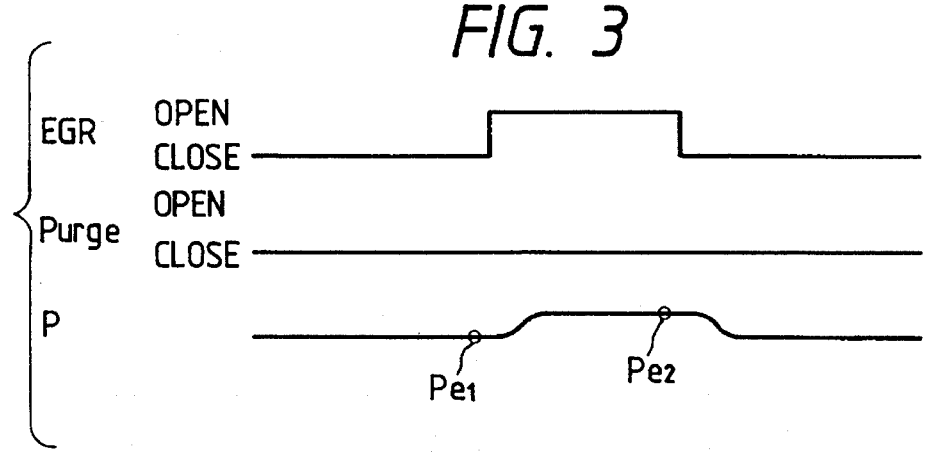
FIG. 3 is a time charts illustrative of an operation of an EGR fault detecting system monitor in the apparatus shown in FIG. 1.
Figure 4:
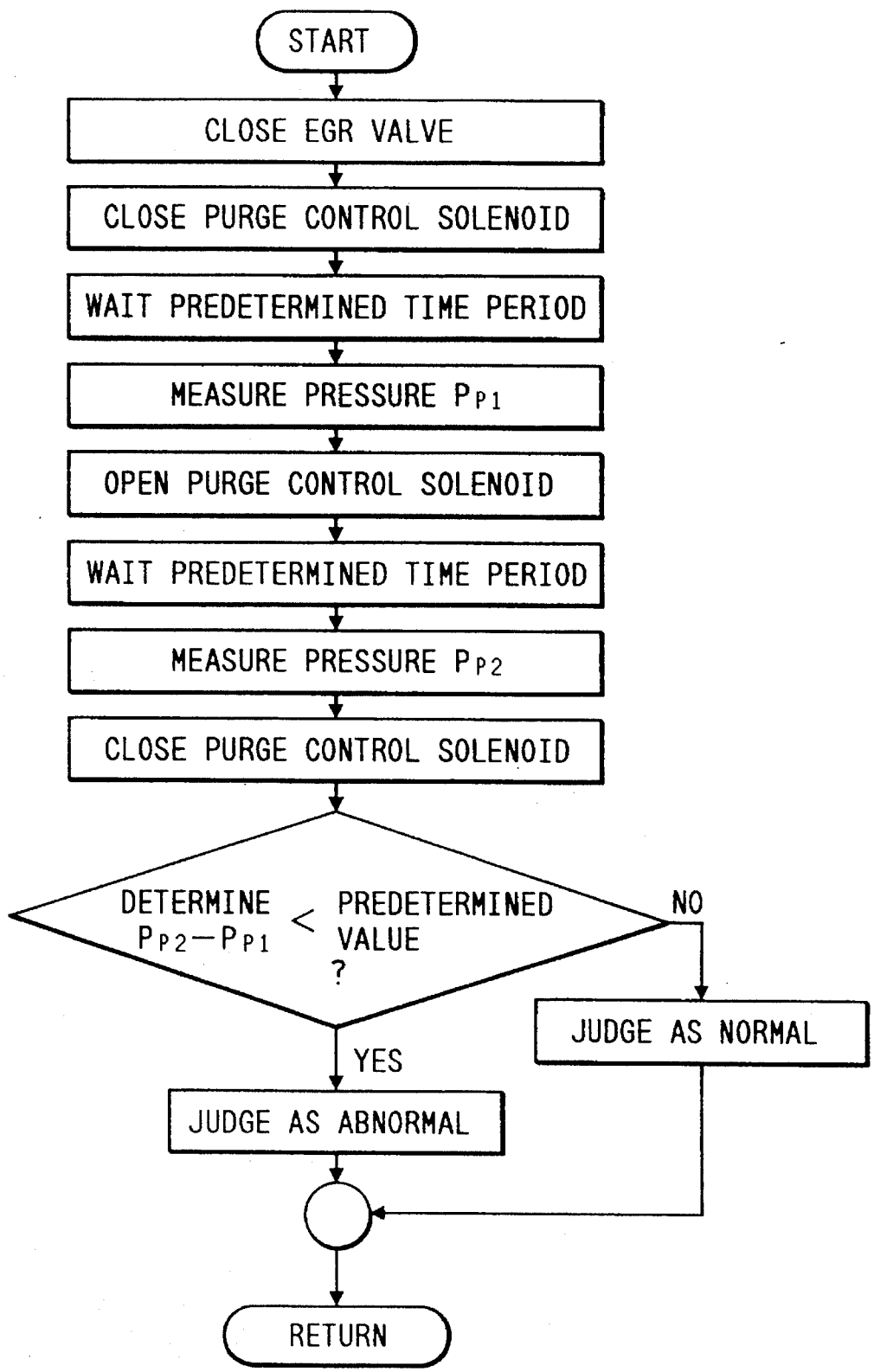
FIG. 4 is a detailed flowchart of a detecting procedure for the purge fault detecting system monitor shown in FIG. 2.
Figure 5:
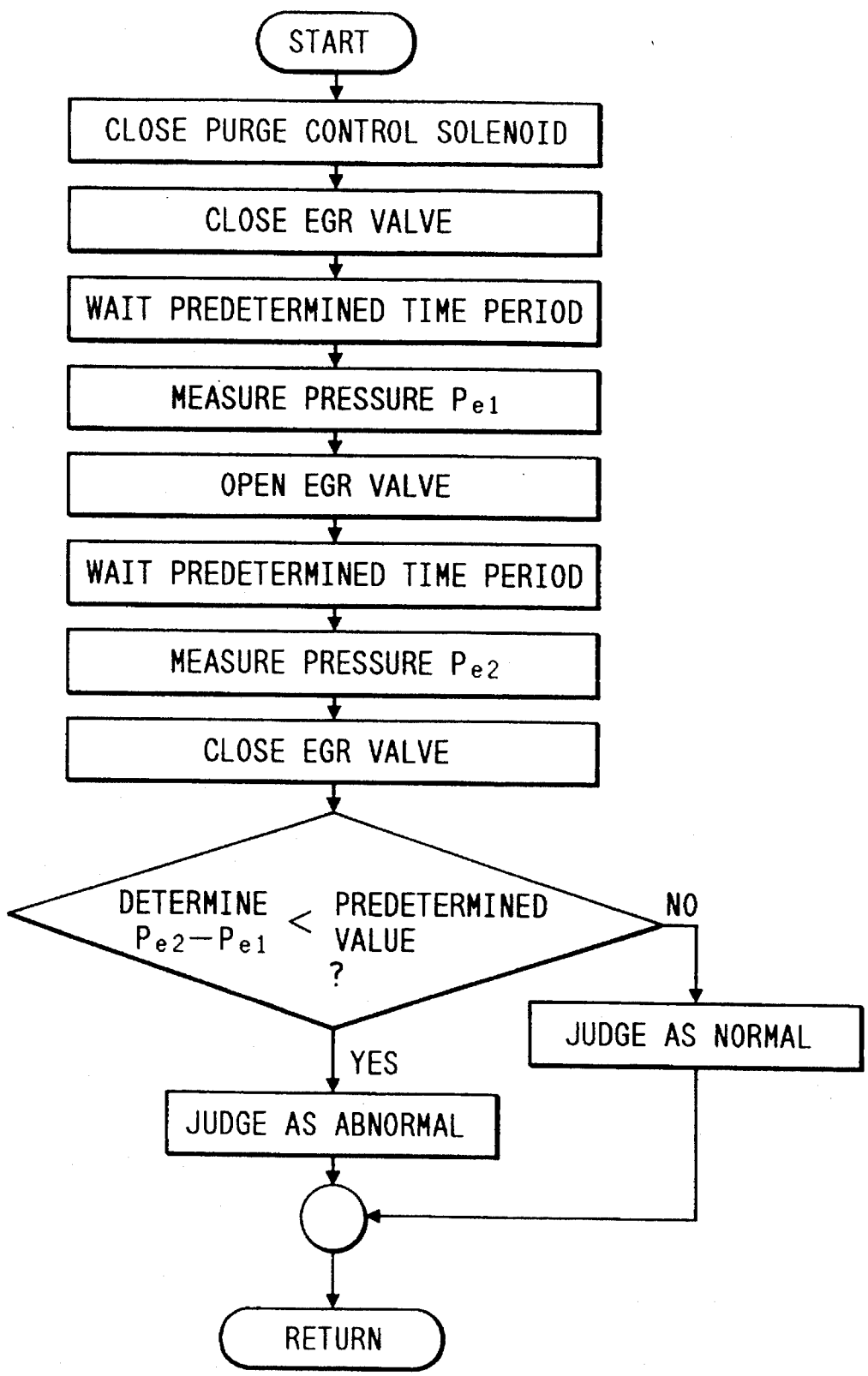
FIG. 5 is a detailed flowchart of a detecting procedure for the EGR fault detecting system monitor shown in FIG. 2.
Figure 7:
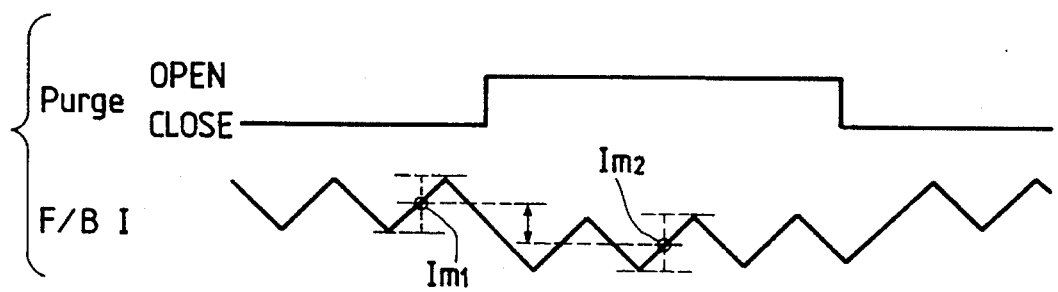
FIG. 7 is a time chart illustrative of an operation of a purge fault detecting system monitor in the apparatus shown in FIG. 6.
Figure 8:
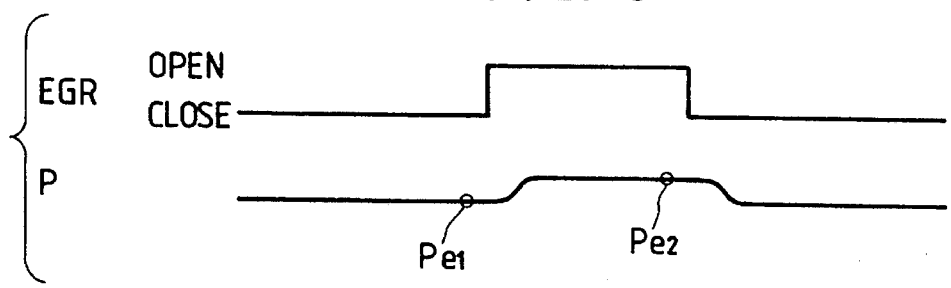
FIG. 8 is a time chart illustrative of an operation of an EGR fault detecting system monitor in the apparatus shown in FIG. 6.

FIGS. 2 and 3 are time charts showing exemplary operations of a fault self-judging unit, assuming that the unit has the same construction as shown in FIG. 1. FIG. 2 shows the operation of a purge fault detecting system monitor; and FIG. 3 shows the operation of an EGR fault detecting system monitor. In FIGS. 2 and 3, the same reference characters as in the conventional example shown in FIGS. 7 and 8 designate the same or like parts and components. FIG. 4 is a detailed flowchart showing a detecting procedure for the purge fault detecting system monitor; and FIG. 5 is a detailed flowchart showing a detecting procedure for the EGR fault detecting system monitor.

Fault judging operations in this embodiment will hereunder be described. In the purge fault detecting system monitor, a pressure Pp1 within the purge air introducing path 8 measured by the pressure sensor 6 with the purge control solenoid 9 closed and an EGR valve 4 closed and a pressure Pp2 within the purge air introducing path 8 with the purge control solenoid 9 opened and the EGR valve 4 closed as shown in FIGS. 2 and 4 are calculated. If a difference between these pressures (Pp2–Pp1) is smaller than a predetermined value, then the operation of the purge fault detecting system is judged abnormal. If, on the other hand, the difference is larger than such predetermined value, then the operation of the purge fault detecting system is judged normal.

Then, the operation of the EGR fault detecting system monitor will be described with reference to FIGS. 3 and 5. In order to make the pressure measured by the pressure sensor 6 equal to the pressure within the surge tank 2a, the purge control solenoid 9 is closed. Then, a pressure Pe1 within the surge tank 2a measured by the pressure sensor 6 with the EGR valve 4 closed and a pressure Pe2 within the surge tank 2a with the EGR valve 4 opened are calculated. If a difference between them (Pe2–Pe1) is smaller than a predetermined value, then the operation of the EGR fault detecting system is judged abnormal. If the difference is greater than such predetermined value, then the operation of the EGR fault detecting system is judged normal.

Since the pressure intake 12 for the pressure sensor 6 is arranged so as to branch the purge air introducing path 8 on the way as described above, extraneous matter such as dust or moisture causing clogging of the pressure sensor 6 can be carried away by the purge air flowing toward the EGR gas entering side, thereby eliminating the cause of clogging of the pressure sensor 6.

Since abnormalities of the purge fault detecting system are detected based on the difference in pressure, not only erroneous detection can be avoided, but also addition of new pressure sensors and the like is not required, thereby contributing to implementing an inexpensive system.

As is self-explanatory, pressure is measured by operating an actuator (a solenoid, a valve, etc.) and waiting for the elapse of a predetermined time interval (several hundreds of milliseconds to several seconds).

While it goes without saying that deviations and response speeds of the measured pressures vary depending on the specification of parts used in a purge fault detecting system including pipes and the like, practically permissible deviations in pressure and response speeds can be obtained with generally used parts.

In FIG. 2, the EGR valve 4 is kept closed during fault judgment of the purge fault detecting system in order to reduce deviations in pressure attributable to factors other than purging. Similarly, actuators such as an idle speed control that might change pressure in an intake manifold 2 are temporarily stopped, or fault judgment is stopped during the operation of these actuators to improve fault judgment accuracy. The same applies to the EGR fault detecting system monitor shown in FIG. 3.

In addition to the above embodiment, a nipple (a thin metal pipe for connecting a rubber pipe) is used to connect the purge air introducing path 8 attached to the surge tank 2a. By setting the inner diameter of the Dipple (practically from 0.5 to 2.0 mm) to an appropriate value (around 1 mm), the nipple serves as a flow rate regulating means to increase a difference in pressure. This contributes to improving fault detection accuracy of the purge fault detecting system, allowing fault judgment to be made over a wider operating range.

While an example in which the purge air introducing path 8 serves as the pressure intake 12 has been described in Embodiment 1, such a pipe as to be attached to the intake manifold 2 of an engine 1 or the like and to allow the air or the mixture of fuel and air to flow toward the intake manifold 2 would be effective in avoiding the clogging of the pressure sensor 6. In addition, in the case where such a pipe whose flow rate is controlled by an ECU 9 or controlling conditions of the flow rate can be checked by the ECU 9, fault judgment of the control system to which such pipe belongs can be made in a manner similar to the purge fault detecting system monitor.

According to the first aspect of the invention, the pressure sensor is disposed on the introducing path extending from the canister, thereby preventing the clogging of the pressure sensor. As a result, a cost reduction can be achieved by simplifying the measure against the clogging of the pressure measuring system is obtained.

According to the second aspect of the invention, erroneous purge system fault detection can be eliminated by detecting a purge system fault based on the difference in pressure is obtained.

According to the third aspect of the invention, the pressure intake of the pressure sensor employed for fault judgment is located close to the purge control solenoid of the purge air introducing path connected to the surge tank. Therefore, the pressure sensor can be shared in common between the purge fault detecting system monitor and the EGR fault detecting system monitor. As a result, a reliable purge system fault judgment device can be obtained without additionally providing new sensors and the like nor increasing the cost is obtained.

According to the fourth aspect of the invention, the flow rate detecting means is disposed on the pressure sensor introducing path. As a result, the performance of the pressure sensor can be improved is obtained.

What is claimed is:

1. A controller for an internal combustion engine, comprising:

an introducing path for introducing air or a mixture of fuel and air into an intake manifold of the internal combustion engine;

a control valve, disposed along the introducing path, for controlling an amount of the air or the mixture of fuel and air introduced therein; and a pressure sensor for detecting pressure within said introducing path between said control valve and said intake manifold;

wherein a first pressure value is detected by the pressure sensor when the control valve is closed, and a second pressure value is detected by the pressure sensor when the control valve is open, said first and second pressure values being compared to make a judgement as to whether or not an abnormal condition exists.

2. A controller for an internal combustion engine, comprising:

an introducing path for introducing air or a mixture of fuel and air into an intake manifold of the internal combustion engine;

a control valve, disposed along the introducing path, for controlling an amount of the air or the mixture of fuel and air introduced therein; and a pressure sensor for detecting pressure within said introducing path between said control valve and said intake manifold;

wherein a pressure value is detected as pressure of the intake manifold when the control valve is closed, and wherein: an EGR fault judgment is effected by detecting a difference in pressure between open and closed states of an EGR valve while closing said control valve when an EGR fault is to be detected; and a purge fault judgment is effected by detecting a difference in pressure between open and closed states of said control valve while closing the EGR valve when a purge fault is to be detected.

3. A controller for an internal combustion engine as claimed in claim 1, wherein a flow rate limiting means is disposed within said introducing path between the pressure sensor and the intake manifold.

4. A controller for an internal combustion engine as claimed in claim 2, wherein a flow rate limiting means is disposed within said introducing path between the pressure sensor and the intake manifold.

5. A method for determining whether a fault condition exists in a controller of an internal combustion engine, said controller including an introducing path which introduces air or a mixture of fuel and air into an intake manifold of the internal combustion engine, said introducing path having a control valve which controls an amount of the air or the mixture of fuel and air introduced therein, said method comprising the steps of:

measuring a pressure within said introducing path when the control valve is closed to produce a first pressure measurement;

measuring a pressure within said introducing path when the control valve is open to produce a second pressure measurement;

comparing the first pressure measurement to the second pressure measurement to form a difference value; and determining whether or not a fault condition exists based upon the difference value.

6. A method for determining a fault condition according to claim 5, wherein said first and second measurements are performed while an EGR valve is closed, said method further comprising the steps of:

measuring a pressure within said introducing path when the control valve is closed and the EGR valve is closed to produce a third pressure measurement;

measuring a pressure within said introducing path when the control valve is closed and the EGR valve is open to produce a fourth pressure measurement;

comparing the third pressure measurement to the fourth pressure measurement to form a second difference value; and determining whether or not an EGR fault condition exists based upon the second difference value.

* * * * *